United States Patent [19]
Hoffman

[11] Patent Number: 5,695,231
[45] Date of Patent: Dec. 9, 1997

[54] LEVERAGE ENHANCING GRIP ASSEMBLY

[76] Inventor: Ned Hoffman, 1252A Pleasant Hill Ave., Sebastopol, Calif. 95472

[21] Appl. No.: 616,481

[22] Filed: Mar. 19, 1996

Related U.S. Application Data

[63] Continuation-in-part of Ser. No. 299,502, Sep. 1, 1994, Pat. No. 5,529,357.

[51] Int. Cl.$^6$ .............................. A01B 1/22; B25G 3/20
[52] U.S. Cl. .............................. 294/58; 16/114 R
[58] Field of Search ................. 294/1.1, 16, 19.1, 294/25, 26, 50.8, 57–59; 15/143.1, 145; 16/110 R, 111 R, 113, 114 R, 125; 30/298, 323, 327; 43/21.2, 23, 25; 56/400.01, 400.04; 74/551.8, 551.9; 172/371, 375

[56] References Cited

U.S. PATENT DOCUMENTS

| | | | |
|---|---|---|---|
| 758,482 | 4/1904 | Smith | 294/58 X |
| 1,599,924 | 9/1926 | Sanborn | 16/125 |
| 4,690,447 | 9/1987 | Adams | 294/57 |
| 4,701,142 | 10/1987 | Merritt | 294/58 X |
| 4,958,407 | 9/1990 | Johnson | 294/58 X |
| 5,133,101 | 7/1992 | Hauser et al. | 294/58 X |
| 5,149,160 | 9/1992 | Iida et al. | 294/16 |
| 5,265,307 | 11/1993 | Hull et al. | 16/125 X |

FOREIGN PATENT DOCUMENTS

| | | | |
|---|---|---|---|
| 531941 | 10/1954 | Belgium | 294/58 |
| 135100 | 11/1919 | United Kingdom | 294/58 |

*Primary Examiner*—Johnny D. Cherry
*Attorney, Agent, or Firm*—Ali Kamarei

[57] ABSTRACT

A full motion leverage enhancing grip assembly for attachment to an elongate handle of a shovel or similar tool is described. The leverage enhancing grip comprising a substantially semi-ellipsoid gripping portion, in planar alignment with the tool handle, extending distally outward from the tool handle relative to the user; a substantially linear attachment portion for engaging the elongate handle of a tool, where the linear attachment portion intersects the gripping portion to form an angle of intersection; and at least one J-clamp and at least one adjustment knob securely placed in a knob housing. The adjustment knob having a hole substantially in the center to receive a threaded rod, the rod being connected at one end to the J-clamp. The rotation of the adjustment knob about its axis within the knob housing, causes the threaded rod and the J-clamp attached to it, to be moved linearly parallel to the axis of the threaded rod, within the hole of the adjustment knob.

6 Claims, 3 Drawing Sheets

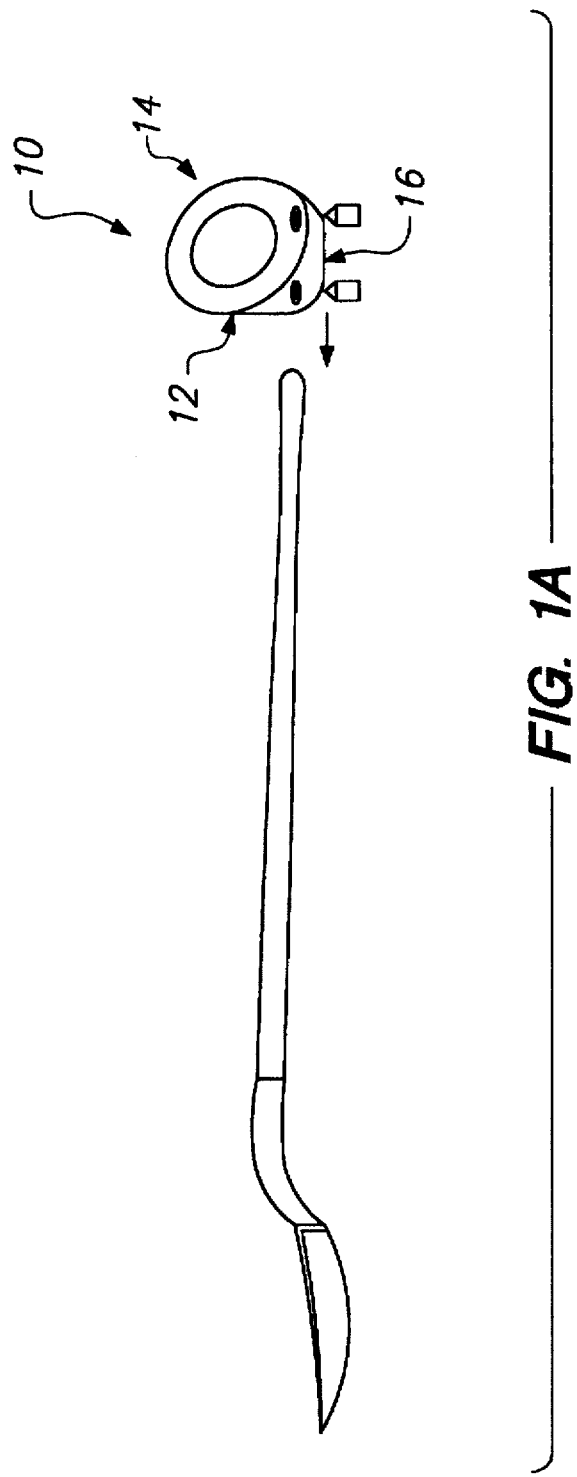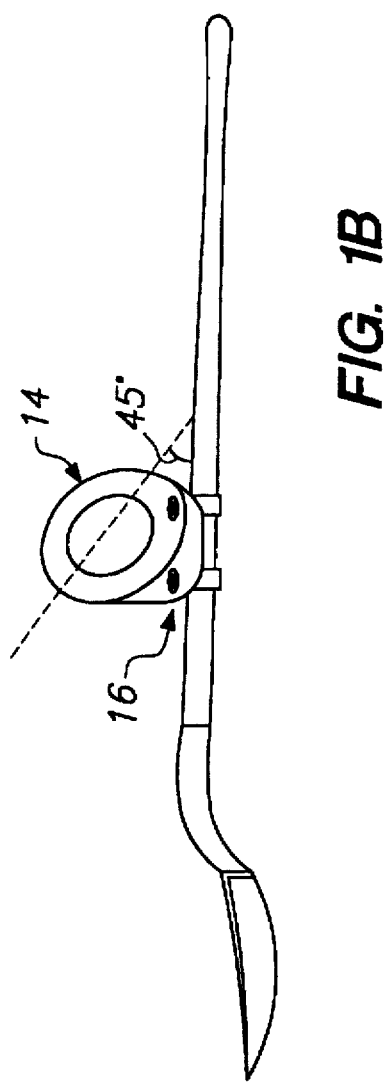
FIG. 1A
FIG. 1B

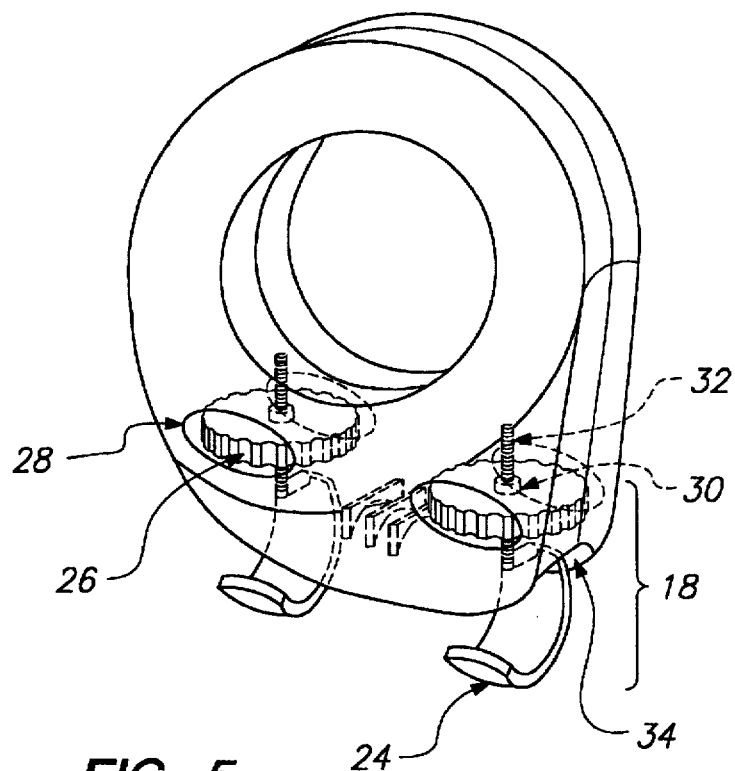
FIG. 5
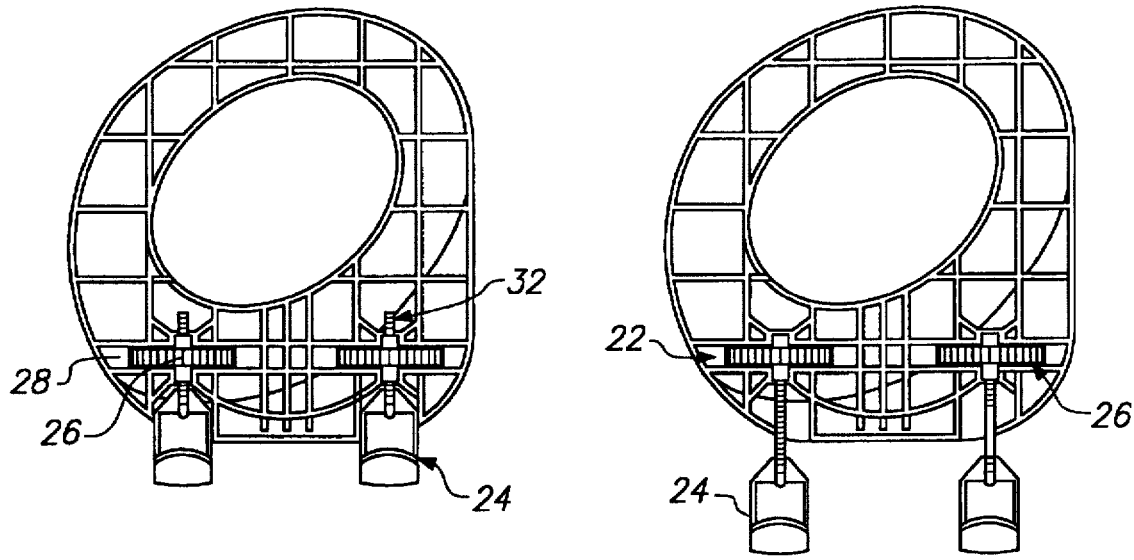
FIG. 6A　　　　FIG. 6B

LEVERAGE ENHANCING GRIP ASSEMBLY

This is a continuation-in-part of U.S. patent application Ser. No. 08/299,502, filed Sep. 1, 1994, now U.S. Pat. No. 5,529,357.

FIELD OF THE INVENTION

The invention relates generally to tools and other implements that generally require use of both of a user's hands and arms to operate, and more particularly, to the modification of such tools to enhance a user's ability to leverage the tool or implement throughout a full range of motions, and thereby increase the stability and control of the tool during use and decrease the amount of muscular exertion required by the user.

BACKGROUND

At one time or another, everyone has used a tool such as a shovel or the like that requires the use of both hands and arms, as well as upper body muscles, for successful utilization. Tools requiring two-handed use share several characteristics. First, they are generally surmounted by an extended pole or shaft by which the tool is gripped and manipulated. These instruments also exhibit a center of gravity that is skewed (relative to the tool's geometric center) strongly toward the distal end of the tool and away from the end gripped by the user. Finally, these tools must be manipulated fully throughout three dimensions in order to operate them successfully and efficiently. This final point cannot be overemphasized. For while in operation the tool may move predominantly in one or a few directions, the user must nevertheless be able to leverage the tool throughout three dimensions without undesirable tiring, muscle strain or loss of control. To accomplish this currently requires the use of two hands and arms to leverage such tools. However, this solution is not desirable as it obligates the user to exert and stress most upper body muscles, particularly muscles of the shoulders, arms and stomach. Further, the leverage problem is exacerbated if the tool is particularly long-handled, of if the tool is used for lifting particularly heavy loads such as with a shovel, either of which operates to displace the tool's center of gravity further from the user, making the tool even more unwieldy.

Unfortunately, human anatomy does not lend itself well to the leveraging of shovels and other such tools for extended periods of time. In order to leverage the tool sufficiently to achieve satisfactory results, one must not only bend, but decidedly twist, one's back. The repeated stooping and torquing of the bones and muscles of the back, neck and shoulders frequently lead to muscle cramping and may ultimately adversely affect the geometry of the spinal column leading to ruptured disks, scoliosis and other pathologies.

Such neck, back and shoulder exertion is unfortunately required if the tool is to be operated in a satisfactory fashion. Because both the center of gravity and the operational end of the tool are distant from the user, great force and precise control by the user are required in order to manipulate the tool through a desired three dimensional range of motions at a precise and desired force.

Workers have, with little success, attempted to overcome these inherent difficulties by redesigning such tools. Generally speaking, these redesign efforts address the issue of leverage and tool control with respect to one type of motion, generally the direction of motion through which the tool is routinely and repetitively moved. However, all tools require at least some motion throughout the full range of possible movement. Thus, prior art improvements, such as those described in more detail below, neither contemplate nor solve the problems overcome by the present invention. Typical examples of such prior art include U.S. Pat. No. 4,822,087 to DeCarlo and U.S. Pat. No. 5,159,775 to Sutula, Jr.

DeCarlo discloses a modified fishing net. The handle of the fishing net is provided with a hand grip and an elbow support. Unlike the present invention, DeCarlo is directed to improving stability and maneuverability of the net in a vertical direction, hence his characterization of the invention as a "lift improvement device." Further, the modifications taught by DeCarlo are designed to increase stability of a device that is already predominantly operated using one hand.

Sutula, Jr. discloses a modified fishing rod. The rod is provided with non-adjustable forearm grips to help stabilize the vertical movement of the fishing rod relative to the forearm. As with DeCarlo, Sutula, Jr. teaches the modification of a tool that is already operated successfully with one arm. Further, as with DeCarlo, the movement that is improved and stabilized is limited to vertical movement.

Improvement of stability and maneuverability throughout a three dimensional range of motion is neither contemplated nor taught by the prior art. Thus, there is a need for an improvement in existing tools requiring two-handed operation, such as shovels and the like, that significantly increases leveraging, and thereby increases tool stability and control, throughout a full, three-dimensional range of motion. Such an improvement may be integral with the tool, or may be designed as a retrofit to be added to existing tools.

There is also a need for an apparatus that increases the leveraging power and maneuverability of tools generally, thereby reducing back strain and overall muscular exertion of the user while increasing tool control and effectiveness.

There is also a great need for a leveraging apparatus that is fully customizable to adapt quickly and precisely to the dimensions of the particular user's arm in conjunction with a particular tool.

SUMMARY

It is an object of the present invention to provide an assembly that allows a user to enhance leverage in all three dimensions, and thereby enhance control and operability of a tool throughout the full range of possible motions.

It is another object of the invention to allow the user of a long handled tool with a center of gravity skewed away from the user, such as a shovel to provide a leveraging apparatus to allow the user to operate the tool more efficiently.

Yet another object of the invention to provide such a leveraging apparatus that can be customized to the dimensions and proportions of a user's arm.

A further object of the invention is to provide an assembly that is light-weight and inexpensive to manufacture.

Yet another object of the invention is to provide such retrofit with a clamping means that prevents the leveraging assembly from twisting, moving or otherwise coming loose relative to the tool handle as various stresses are applied to the leveraging assembly during use.

Still another object of the invention is to provide a retrofit apparatus that is universally adaptable both to the dimensions of the arm of a given user, but also to the dimensions of the handle of the desired tool.

Yet another object of the invention is to provide a quick tightening and locking means for easy mounting and removal of the leverage enhancing grip assembly or other devices, upon an elongate handle of a tool, without the aid of screwdrivers or wrenches.

A general and central object of all embodiments of the invention is to provide a leveraging means that significantly stabilizes the operation of a tool relative to the center of gravity of the tool, thereby reducing the total number of user muscle groups and the total amount of user muscle exertion needed to operate a tool successfully throughout three dimensions for protracted periods.

The present invention meets these objects and overcomes the shortcomings of the prior art by providing an inexpensive, easy to use leveraging apparatus that can be retrofitted on existing tools, or that can be formed integral with the tool.

A full motion leverage enhancing grip assembly is described for attachment to an elongate handle of a shovel or similar tool. The leverage enhancing grip assembly comprises a substantially ellipsoid gripping portion, in planar alignment with the tool handle, extending distally outward from the tool handle relative to the user, and either actually or hypothetically intersecting the tool handle to form an included angle of between about 35 to 90 degrees. In a preferred embodiment, the angle is between about 40 and 50 degrees. The grip assembly further comprises a substantially linear portion for engaging the elongate handle of a tool, and means for adjustably securing the leverage enhancing grip assembly to the tool handle.

The assembly preferably has a gripping portion which has an inner gripping edge and an outer gripping edge. The inner gripping edge is textured to comfortably provide for stronger frictional contact with the user's hand. Furthermore, the inner gripping edge is preferably repeatedly contoured at an interval compatible to comfortably receive the fingers of the hand of the user.

The assembly also has at least one J-clamp that is connected to a threaded rod. At least one adjustment knob is securely placed in a knob housing. The adjustment knob has a hole substantially in the center to receive the threaded rod, such that the rotation of the adjustment knob about its axis within the knob housing, causes the threaded rod and the J-clamp attached to it, to be moved linearly parallel to the axis of the threaded rod within the center hole of the adjustment knob. This will allow for quick and easy removal or adjustment of the leverage enhancing grip assembly at any point along the length of the elongate handle of a tool.

In a most preferred embodiment, the grip assembly's linear portion which is meant to engage the elongate handle of the tool is C-shaped for reciprocal receiving of an elongate handle of a tool which is also generally curved or O-shaped.

Other objects, advantages and applicability of the invention will become apparent upon consideration of the drawings and detailed description of the invention that follows below.

BRIEF DESCRIPTION OF THE DRAWINGS

FIG. 1A is a side view of one embodiment of the leveraging grip assembly not yet mounted on the elongate handle of the tool. FIG. 1B is a side view of the embodiment shown in FIG. 1A where the leverage enhancing grip assembly is mounted on the elongate handle of a tool.

FIG. 5 is a cut-away perspective view of the adjustable securing means of the invention.

FIG. 6A is a side view of the adjustable securing means with the J-clamps in the closed position.

FIG. 6B is a side view of the adjustable securing means with the J-clamps in the open position.

DETAILED DESCRIPTION OF THE INVENTION

Turning now to the figures, certain embodiments of the present invention will now be described. FIGS. 1A and 1B are views of an embodiment of the leverage enhancing grip assembly 10 of the invention. In these figures, it is demonstrated how an elongate handle of an existing tool, such as a shovel, accommodates the leverage enhancing grip assembly 10.

Figure 4:
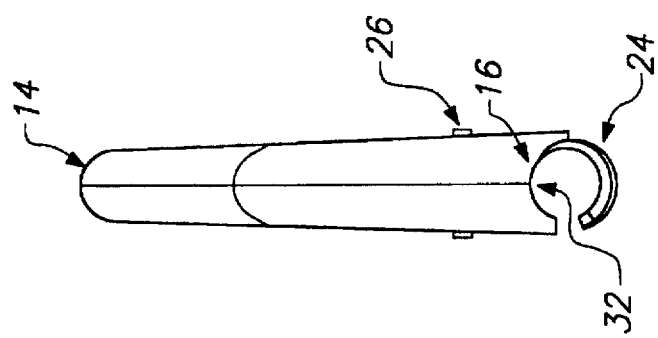
FIG. 4 is a front view of the embodiment of the assembly of FIG. 1.
Figure 3:
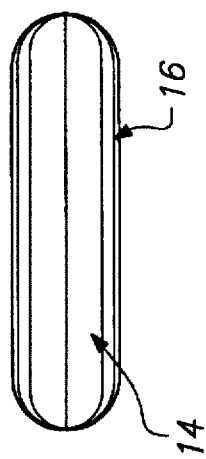
FIG. 3 is a top view of the leveraging grip assembly.
Figure 2:
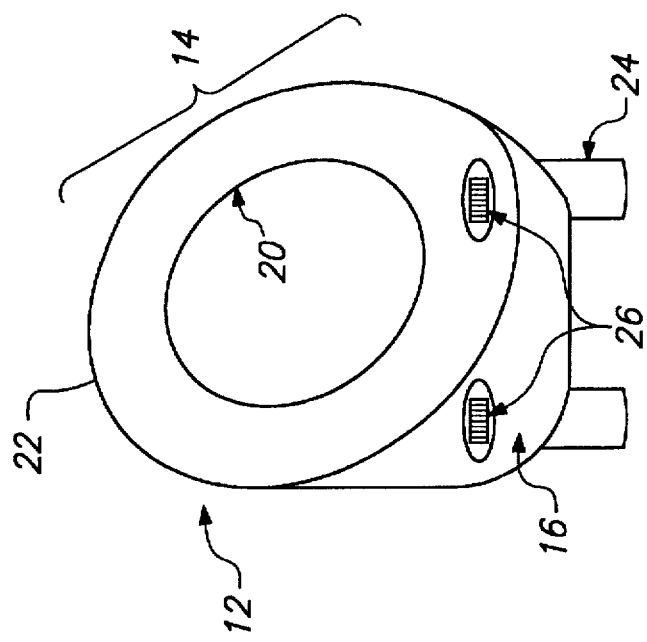
FIG. 2 is a side view of an embodiment of the invention without the tool.

Focusing now on FIGS. 2–6, the leverage assembly 10 is provided with a housing 12 having a gripping portion 14 which is substantially semi-ellipsoid or semi-circular in shape, and an attachment portion 16. The attachment portion 16 is substantially linear, for attachment to an elongate handle of a tool. The gripping portion 14 preferably has an inner edge 20 and an outer edge 22. The inner edge 20 is textured to comfortably receive and provide for stronger frictional contact with the user's hand. Furthermore, the inner edge 20 is preferably repeatedly contoured at an interval compatible to comfortably receive the fingers of the hand of the user. The attachment portion 16 is preferably C-shaped for better engagement of elongate handles of tools which are generally O-shaped.

The long axis of the semi-ellipsoid shape of the gripping portion 14 and the axis of the attachment portion 16 intersect either actually or hypothetically, to form an angle between 35 and 90 degrees. In a preferred embodiment the angle of intersection is between about 40 and 50 degrees.

The assembly 10 also has means for adjustable securing of the assembly 10 to the elongate handle of the tool using at lease one adjustable J-clamp 24, which is attached at one end to a threaded rod 32, and at least one adjustment knob 26 which is housed within knob housing 28. The adjustment knob 26 also has a knob hole 30 substantially in the center, and of such diameter to receive the threaded rod 32. In a preferred embodiment, two sets of the adjustable means described above are employed as shown in the figures.

Operationally, the threaded rod 32 is threaded into the knob hole 30 of the adjustment knob 26. Thereafter, by turning the adjustment knob 26 within the knob housing 28, the threaded rod 32 is moved linearly parallel to the axis of the threaded rod 32, and within the knob hole 30. Thus, a quick and convenient means for adjustment, or attachment and removal of the leverage enhancing grip assembly is shown.

Although the invention has been just described with reference to certain physical embodiments, it will be understood that these embodiments are intended as illustrative examples only, and thus that various modifications and changes are possible with respect to these embodiments that nevertheless fall within the spirit and scope of the invention as claimed below.

What is claimed is:

1. A full motion leverage enhancing grip assembly for attachment to an elongate handle of a shovel or similar tool, said full motion leverage enhancing grip assembly comprising:

a. a substantially semi-ellipsoid gripping portion having an inner gripping edge, in planar alignment with the tool handle, extending distally outward from the tool handle relative to the user;

b. a substantially linear attachment portion for engaging the elongate handle of a tool, where the linear attachment portion intersects the inner gripping edge to form an angle of intersection between about 35 and 90 degrees; and c. means for adjustably securing the full motion leverage enhancing grip assembly to the tool handle, wherein the means for adjustably securing comprises at least one J-clamp, at least one adjustment knob securely placed in a knob housing, said adjustment knob having a hole substantially in the center to receive a threaded rod, said rod being connected at one end to the J-clamp, such that the rotation of the adjustment knob about its axis within the knob housing, causes the threaded rod and the J-clamp attached to it, to be moved linearly parallel to the axis of the threaded rod, within the hole of the adjustment knob.

2. The leverage enhancing grip assembly of claim 1 wherein said inner gripping edge is contoured at an interval compatible to comfortably receive the fingers of the hand of the user.

3. The leverage enhancing grip assembly of claim 1 wherein the linear attachment portion of the leverage enhancing grip assembly is C-shaped in cross section for reciprocal receiving of a tubular shaped elongate handle of a tool.

4. The leverage enchancing grip assembly of claim 1 wherein the angle of intersection is between about 40 and 50 degrees.

5. A full motion leverage enhancing grip assembly for attachment to an elongate handle of a shovel or similar tool, said full motion leverage enhancing grip assembly comprising:

a. a substantially semi-ellipsoid gripping portion having an inner gripping edge, in planar alignment with the tool handle, extending distally outward from the tool handle relative to the user;

b. a substantially linear attachment portion for engaging the elongate handle of a tool, where the linear attachment portion intersects the gripping portion to form an angle of intersection between about 35 and 90 degrees;

c. means for adjustably securing the full motion leverage enhancing grip assembly to the tool handle; wherein the means for adjustably securing comprises at least one J-clamp, at least one adjustment knob securely placed in a knob housing, said adjustment knob having a hole substantially in the center to receive a threaded rod, said rod being connected at one end to the J-clamp, such that the rotation of the adjustment knob about its axis within the knob housing, causes the threaded rod and the J-clamp attached to it, to be moved linearly parallel to the axis of the threaded rod, within the hole of the adjustment knob.

6. The leverage enhancing grip assembly of claim 5 wherein the angle of intersection is between about 40 and 50 degrees.

* * * * *